D. R. BOWEN.
RUBBER CRACKER.
APPLICATION FILED JULY 11, 1919.

1,390,599.

Patented Sept. 13, 1921.
6 SHEETS—SHEET 4.

Inventor.
David R. Bowen,
By [signature]
Attorney.

D. R. BOWEN.
RUBBER CRACKER.
APPLICATION FILED JULY 11, 1919.

1,390,599.

Patented Sept. 13, 1921.
6 SHEETS—SHEET 5.

Inventor.
David R. Bowen,
By (signature)
Attorney.

D. R. BOWEN.
RUBBER CRACKER.
APPLICATION FILED JULY 11, 1919.
1,390,599.
Patented Sept. 13, 1921.
6 SHEETS—SHEET 6.
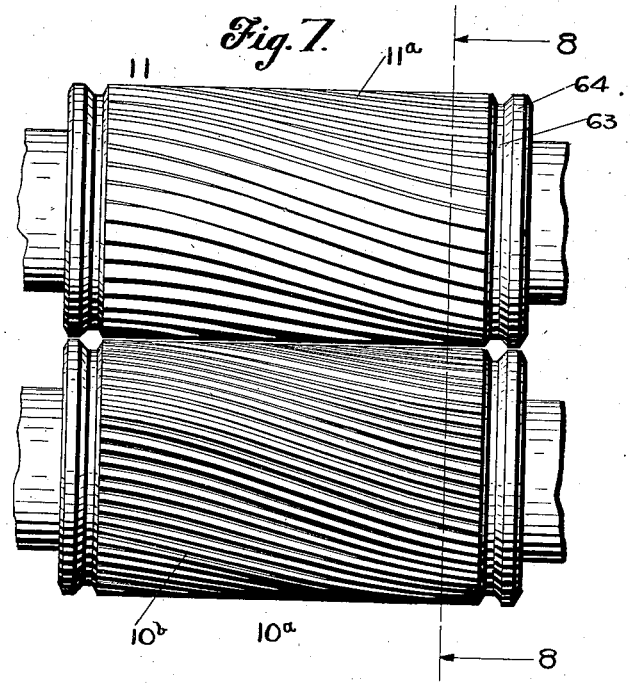
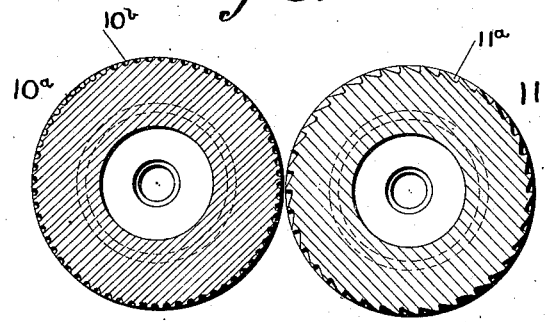
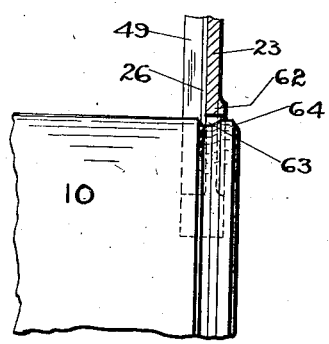
Inventor
David R. Bowen
By *[signature]*
Attorney

UNITED STATES PATENT OFFICE.

DAVID R. BOWEN, OF ANSONIA, CONNECTICUT, ASSIGNOR TO FARREL FOUNDRY & MACHINE COMPANY, OF ANSONIA, CONNECTICUT, A CORPORATION OF CONNECTICUT.

RUBBER-CRACKER.

1,390,599.

Specification of Letters Patent. Patented Sept. 13, 1921.

Application filed July 11, 1919. Serial No. 310,021.

*To all whom it may concern:*

Be it known that I, DAVID R. BOWEN, of Ansonia, New Haven county, Connecticut, have invented certain new and useful Improvements in Rubber-Crackers, of which the following is a full, clear, and exact description.

This invention relates to an improved machine for cracking or sheeting baled rubber. While the machine is adapted for satisfactory operation on rubber of various kinds, either in the form of bales or balls of different shapes or otherwise, it is particularly intended for cracking or sheeting bales of plantation rubber such as are commonly formed in baling presses on the plantations. At the present time plantation rubber is received in this country in bales that are made by folding the sheets of crude rubber, for example, sheets of so-called crepe, alternately in opposite directions so as to create a multiplicity of layers and then compressing the layers in a baling press to a sufficient degree to obtain a solid bale.

Considerable difficulty has been encountered in handling bales of this kind in rubber factories for the production of refined rubber, on account of the bulk of the mass and the toughness and other characteristics of the material. An extraordinary amount of strength is required to tear the crude rubber apart for the purpose of obtaining pieces of the required small size for further treatment. The first operation incident to the manufacture of rubber articles from the crude rubber is the so-called cracking operation which consists of putting the rubber through a pair of cracker rolls. It has been attempted to put the rubber through the cracker rolls while it is in the form of a bale without first tearing it apart but, so far as I am aware, this procedure has never been carried out in a satisfactory manner. In the first place the bale, when forced by hand between the cracker rolls, can not be held effectively in the bite of the rolls. The resiliency of the mass, combined with the lateral pressure exerted by one or the other of the rolls, causes the bale to jump upward out of the roll bite, which frequently causes the complete rupture of the thin sheet passing between the rolls. The bale then has to be re-introduced between the rolls and the formation of the new sheet commenced. This difficulty in feeding in the bale with the incident rupture of the sheet is a drawback of no small importance. In the second place the feed of the sheet, when the bale is fed in by hand, lacks uniformity in any case, for while the rubber may pass between the rolls at one end, it may not do so at the other end. By this method it is very difficult if not impossible, to obtain a sheet of any length having a uniform width and uniform thickness.

In order to avoid the drawbacks just mentioned, it has been the practice in some cases to place the rubber bales in a hydraulic press for the purpose of splitting them apart before putting the crude rubber through the cracker, but this operation also has serious disadvantages owing to the lack of uniformity in the work of the press and the fact that a very large separate machine is required from which the rubber, after having been split open in a not very satisfactory manner, has to be carried to the cracker rolls.

One of the primary objects of my invention is to provide an improved rubber cracker which operates on rubber bales very satisfactorily, and wherein the above mentioned disadvantages are avoided. In my machine the bale can be fed between the cracker rolls positively by mechanical means with the required amount of pressure to give the most satisfactory results. The machine effects considerable saving in labor and requires very little attention to operate satisfactorily. After the bale has been engaged in the bite of the rolls, it is practically impossible for it to jump out of the same, and as an even pressure in the top of the bale can be obtained, which is regulable as required by conditions, the bale will be fed through the rolls at the proper rate without disruption of the sheet. Likewise, by equalizing the pressure which is exerted over the upper part of the bale, the sheet passing out of the rolls can be maintained at a uniform width corresponding approximately to the length of the rolls.

To these and other ends, the invention consists in the novel features and combinations of parts to be hereinafter described and claimed.

In the accompanying drawing.

Figure 1:
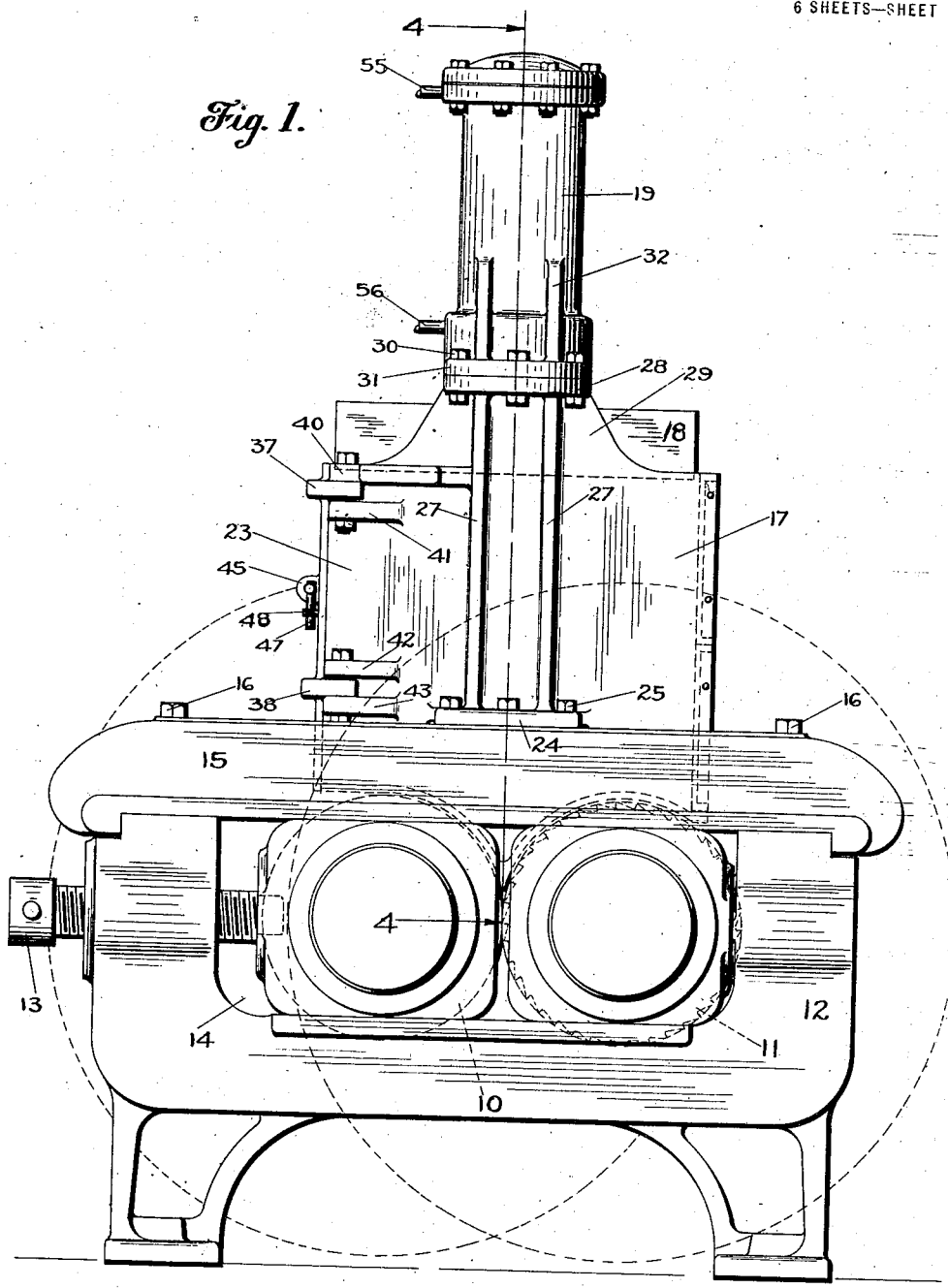
Figure 1 is a side elevation of a rubber cracker, embodying my improvements.
Figure 2:
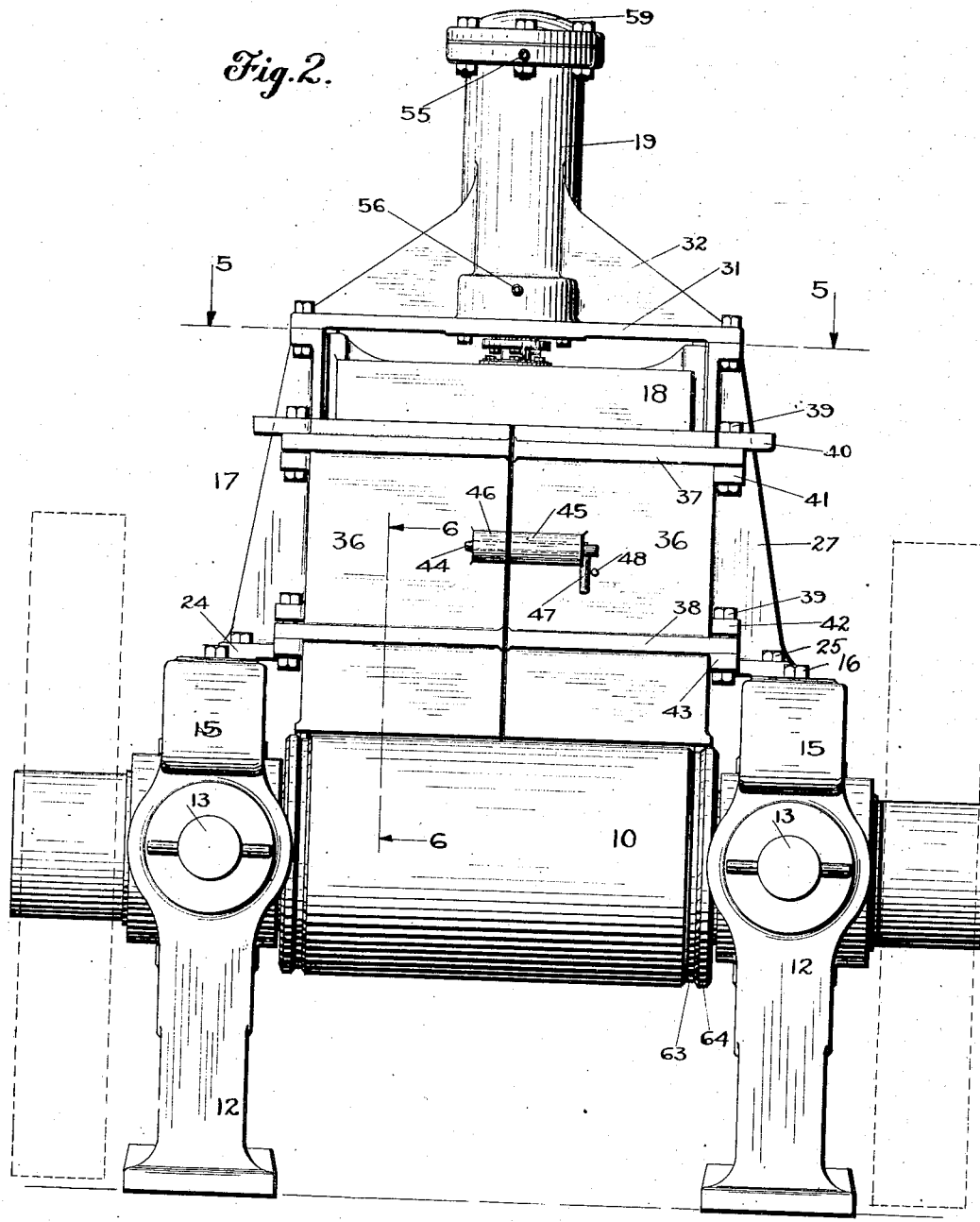
Fig. 2 is a front elevation of the same.
Figure 3:
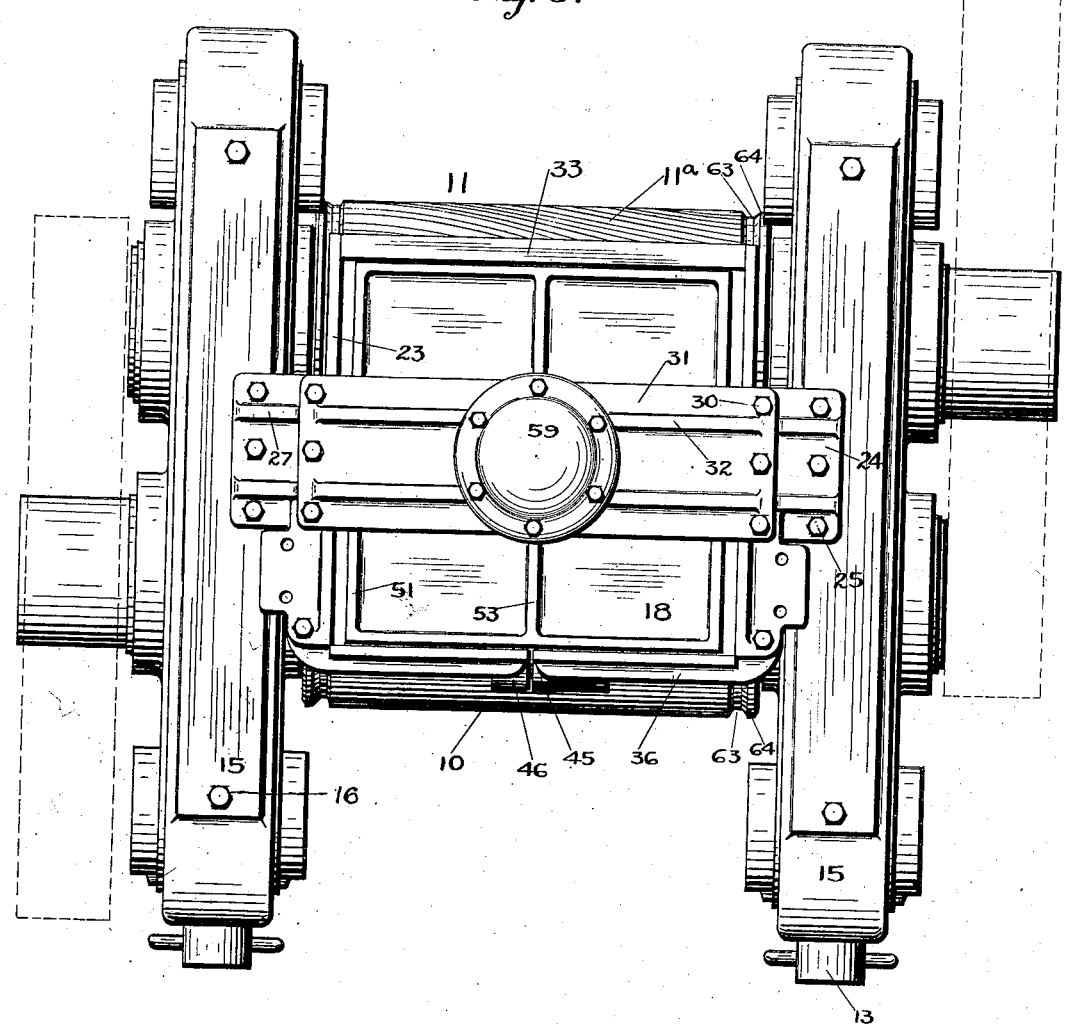
Figure 4:
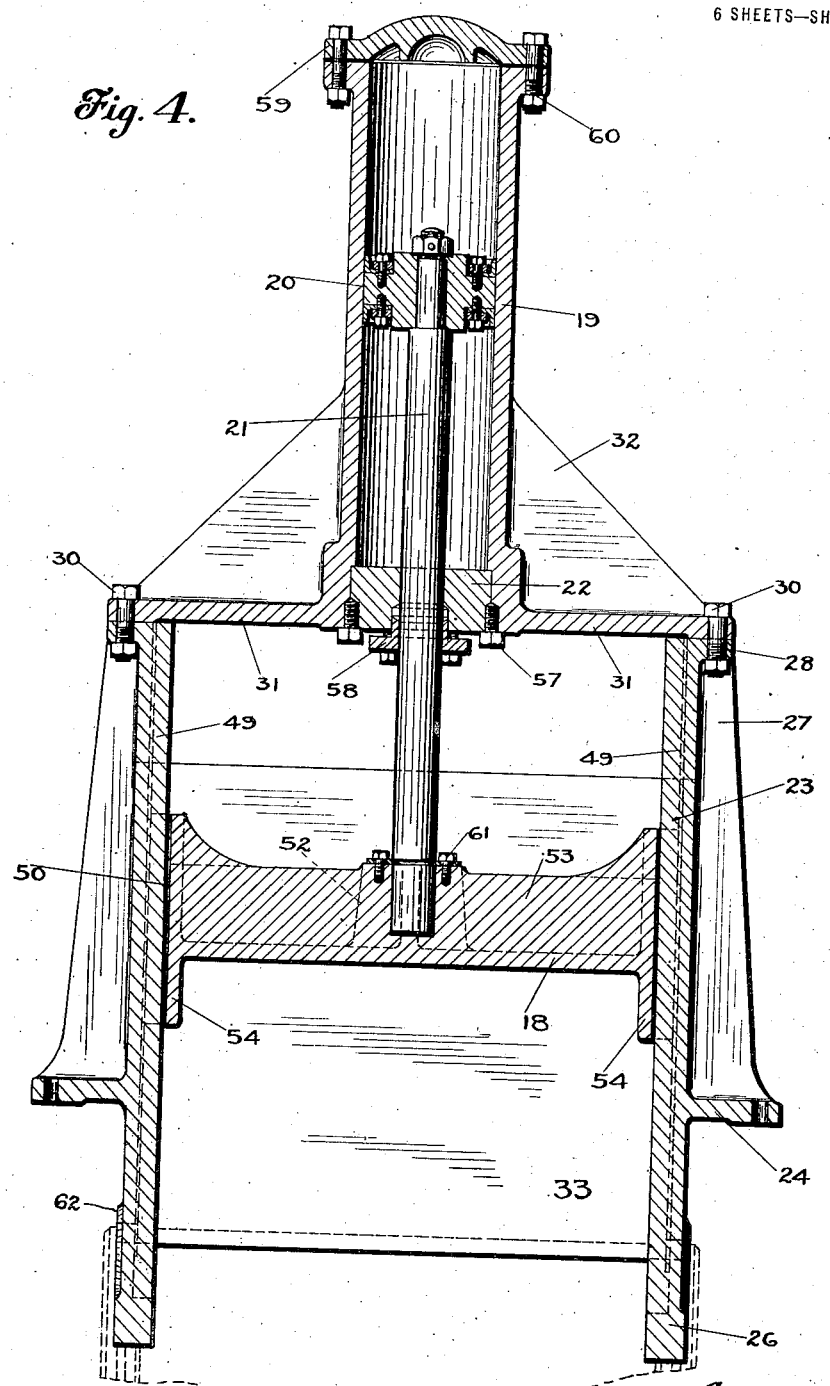
Figure 5:
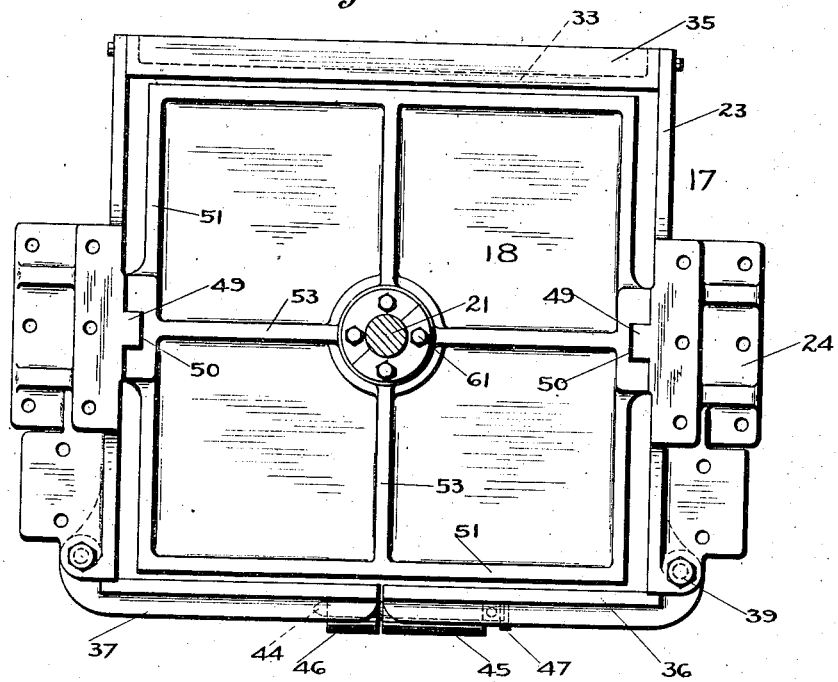
Figure 6:
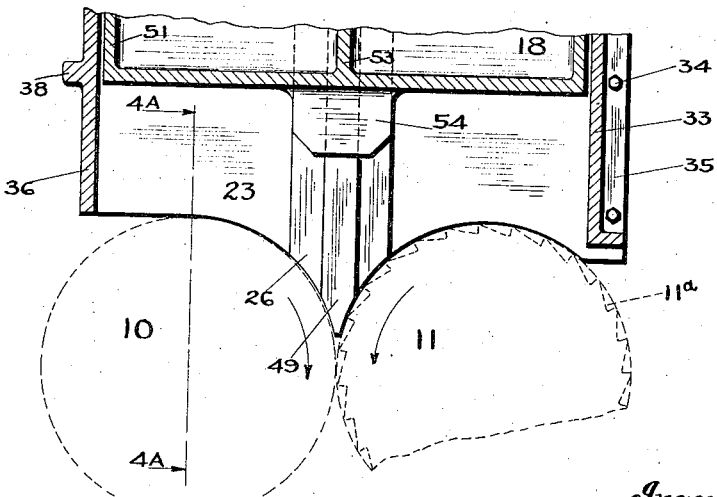

Fig. 3 is a top plan view of the machine;
Fig. 4 is a section on line 4—4 of Fig. 1;
Fig. 4<sup>A</sup> is a section on line 4<sup>A</sup>—4<sup>A</sup> of Fig. 6;
Fig. 5 is a section on line 5—5 of Fig. 2;
Fig. 6 is a section on line 6—6 of Fig. 2, with the rolls shown in dotted lines;
Fig. 7 is a top plan view showing a modified arrangement of the rolls; and
Fig. 8 is a section on line 8—8 of Fig. 7.

The machine selected for illustration comprises, in general, a pair of differentially driven cracker rolls arranged in a horizontal plane, and a mechanically operated pressure or feed device for feeding downward into the bite of the rolls in a positive manner a bale positioned on top of the rolls. What may be termed the front cracker roll is shown at 10, whereas the rear cracker roll is designated 11. They are mounted in side frames 12 in the customary manner, and the bite of the rolls is adjustable by adjusting devices 13 of well-known type, which it is unnecessary to refer to in detail. The roll shafts are mounted in the customary manner in bearings located within openings 14 of the respective side frames and held in place in the usual way by cap plates or blocks 15 detachably secured to the respective side frames in any convenient manner, for example, by bolts 16. The rolls are driven in the ordinary way by gearing, which I have not considered it necessary to illustrate in detail. Usually, the rear roll will be driven about fifty per cent faster than the front roll. In the machine shown in Figs. 1 to 6, the front roll has a smooth surface, but the rear roll is grooved, as shown at 11<sup>a</sup>, to provide sharp ribs or teeth which are adapted to bite into the rubber and carry it between the two rolls. In the form shown, the grooves are inclined somewhat relatively to the longitudinal axis of the roll. As shown in Fig. 6, the ribs of the roll 11 have substantially radial front faces. The rear face of each rib is slanted gradually from near the biting edge to the inner margin of the front face of the next rib.

In the form shown, the device for feeding the bales between the cracker rolls is mounted above and between said rolls on the cap blocks 15, to which it is connected in a detachable manner. The device consists generally of a bale receiving box or casing 17, provided with a vertically movable interior plunger or follower 18, which in this instance is operative by fluid pressure, such as compressed air. For this purpose, a compressed air cylinder 19 is arranged in an upright position above the box or casing and is provided with a vertically movable piston 20 having a piston rod 21 passing through an opening in a head 22 at the lower end of the cylinder and connected in a suitable manner with the plunger or follower 18 at the upper part thereof. The cylinder 19 is supported on top of the side walls of the box or casing 17.

The box or casing is, in this instance, approximately square in horizontal section. It comprises side plates, an end plate at the rear of the machine, and a suitable closure, such as a pair of swinging doors, at the front of the machine, which doors are opened for the introduction of the bale and then closed during the forcing or feeding operation.

Plunger 18 corresponds generally in shape with the box or casing and is therefore, in this instance, also of square shape. The side plates of the casing, which are designated 23, are provided somewhat above their lower ends with lugs or brackets 24, which extend laterally outward over the tops of the respective cap blocks 15 and are detachably secured thereto by bolts 25. The box or casing is located over both of the rolls 10, 11, and extends downward into close proximity thereto. At the middle of each side plate 23, the same has a pointed, downwardly directed extension, which fits into the space between the rolls at the corresponding end of said rolls. Such downwardly directed extension is shown at 26 in Fig. 6. The bracket 24 is located at about the center of the side plate so as to rest on the upper surface of the cap block and is reinforced by upright flanges 27 on the side plate, the bracket and flanges being preferably cast as an integral part of the plate. At their upper portions, the flanges 27 are integral with an outwardly directed lateral flange 28, which is located at the top of an upward extension 29 on the cap plate, and the air cylinder casting is bolted to the flanges 28 of the side plates by means of bolts 30. These bolts 30 pass downwardly through registering openings in supporting arms 31 for the cylinder and in the flanges 28. The arms 31 are cast as an integral part of the cylinder structure and extend laterally therefrom at the base of the cylinder to form a base plate or bridge by means of which the cylinder structure is supported on top of the side plates of the casing. The arms 31 are reinforced by flanges 32, located in the angles between the upper surfaces of the arms and the upright wall of the cylinder and cast integral with the arms and cylinder.

The rear end plate of the box or casing, which is shown at 33 in Figs. 5 and 6, is bolted between the side plates by means of bolts 34. In order to reinforce the plate 33, the same is provided with out-turned flanges at its margins, and the bolts pass through the flanges at the sides of this plate and through registering openings in the side plates. At the front of the box or casing, swinging doors 36 are provided, which are pivotally mounted on the respective side plates to swing in a horizontal plane. Each of the doors is provided with upper and lower flanges 37, 38, and these flanges are extended laterally beyond the side edges of the respective doors and perforated for the passage of pintle bolts 39, which connect the doors pivotally with suitable supporting flanges cast integral with and extending laterally from the side plates 23. The flange 37 of each door is fitted between flanges 40, 41, on the corresponding side plate at the upper portion thereof, and the flange 38 on each door is fitted between flanges 42, 43, on the lower portion of the corresponding side plate.

The doors 36 may be held in the closed position by any suitable form of lock or latch. In the present instance, a sliding locking bolt 44 is mounted in a sleeve 45 on one door and is adapted to be shot into a registering sleeve 46 on the other door for the purpose of locking the doors in the closed position. The bolt 44 may be manipulated by an arm 47 which, when moved downward to the position shown in Fig. 2, coöperates with a pin 48 in such a manner as to form a stop, which prevents the bolt from working loose. When the arm 47 is grasped and swung upwardly, it will clear the pin 48, and the bolt can then be readily pulled out of the sleeve 46 so as to release the doors for opening.

The plunger or follower 18, in the form shown, is guided on the side plates for up and down movement but has no bearing either on the end plates 33 or on the swinging doors. In other words, it is guided directly on the side walls of the box, independent of the front and rear walls, in such a manner as to prevent it from having any appreciable lateral movement, whereby it is held at all times in proper alinement with its actuating cylinder. By this arrangement the piston rod 21 is also relieved of twisting strains. In the example illustrated, the plunger is guided on the side plates by means of guide ribs 49, on the inner surfaces of said plates, which may be cast integral with the plates and are preferably located at about the center thereof. These guide ribs engage corresponding guide grooves 50 formed in the respective side edges of the plunger. Inasmuch as the material compressed by the plunger is not of a very plastic nature, it is not necessary for the edges of the plunger to fit closely against the walls of the box, and I prefer to leave a considerable amount of clearance around the plunger, as shown in Fig. 5, except at those points where the grooved portion of the plunger engages the ribbed portion of the side plates.

The plunger 18 is preferably constituted by a casting comprising a web portion for engaging and forcing down the material, and integral upwardly directed reinforcing flanges 51 at the margins of the web. At the center of the plunger is a hub 52, which is joined with the marginal flanges 51 by radial strengthening flanges 53.

The front and rear walls of the box do not extend as high as the side walls, which are provided, as previously described, with the upward extensions 29, to which the cylinder structure is bolted. The arrangement is such that when the plunger is raised to the limit of its upward movement, its lower face is substantially at the same level as the top edges of the fixed rear wall and the movable front wall respectively of the box. The guide ribs 49 extend substantially throughout the height of the side plates. At their lower ends they extend downward to the bottom of the extension 26, and at their lower extremities they are cut away to conform to the curvature of the rolls, as shown in Fig. 6. Movement of the plunger is limited in a suitable manner. The plunger has downwardly extending lugs 54 cast integral with the grooved portions at the sides of the plunger, and these lugs 54 are provided with guide grooves which form continuations of the guide grooves of the plunger flanges. Thus, the plunger is, in effect, provided with both upward and downward extensions at the sides, which are grooved to form continuous bearings of some length on the guide ribs so that the plunger will be guided effectively.

Compressed air is admitted to and exhausted from the cylinder 19 in any preferred manner. I have not considered it necessary to describe this feature in detail, but the compressed air connections to the cylinder are indicated at 55 and 56, in Figs. 1 and 2. The head 22 at the lower end of the cylinder is detachably held in place by bolts 57 and is provided with a suitable stuffing box 58. The head 59 at the upper end of the cylinder is detachably held in place by bolts 60. The lower end of the piston rod 21 extends into a socket in the hub 52 of the plunger and is detachably held therein by a split ring connection or the like, as indicated at 61, in Fig. 4. In case a split ring is used, the inner edge of the same engages a suitable annular groove in the piston rod, as shown in Fig. 6.

The side plates 23 extend forwardly to a considerable distance beyond the center of the front roll and rearwardly to a considerable distance beyond the center of the roll. Their lower ends, which are curved to conform to the rolls, as shown in Fig. 6, are preferably provided at the outside with flanges 62. As will be seen from Fig. 4A, the ends of the rolls extend slightly outward beyond the side plates. The main part of the inner face of each plate is located somewhat beyond the end of the working faces of the rolls. At the end of the working face of each roll is an annular groove 63, and beyond the groove is a shoulder or collar 64 at the extreme end of the roll. The collars 64 are at least equal in diameter to the maximum roll diameter, and therefore the collars of the two rolls limit the approaching movement of the rolls toward each other and prevent the teeth or ribs of one roll from biting into the other roll and thereby injuring the same. The curved flanges 62 extend outwardly over the collars 64 to a certain extent and are in close proximity to the cylindrical faces of the collars, with only a slight amount of clearance.

In the modification shown in Figs. 7 and 8, the rear roll 11 is of the same kind previously described, but the front roll $10^a$, instead of being a smooth roll, is provided with grooves or corrugations $10^b$. The grooves or corrugations $10^b$ are preferably approximately semi-circular in cross-section. The grooving is finer than in the case of the rear roll 11, the grooves being of less width and set closely together, as shown in Fig. 8. In the form shown, the grooves of both rolls are spirals of considerable pitch, so that they extend approximately longitudinally of the roll, but the grooves may be perfectly straight and in exact parallelism with the roll axis.

In the operation of the machine, the rolls are adjusted so that they are, say, about one-sixteenth of an inch apart. If they are set too far apart, the load on the machine will be so great as to stall the machine or otherwise injuriously affect the operation. The swinging doors of the box or casing having been opened, the bale which is to be cracked is introduced into the box, after which the doors are closed and locked in the closed position. It will be understood that the rolls rotate continuously. With the bale in the box, beneath the plunger 18, which at this time is in the completely elevated position, compressed air is introduced into the upper part of the cylinder 19 so as to force down the piston and carry the plunger downwardly against the top of the bale with a considerable amount of pressure. In this manner, the bale is forced into the bite of the rolls and held there, so that it cannot jump upward and thereby disrupt the thin sheet which begins to pass downward between the rolls as soon as the latter grip the mass. The air pressure is so controlled, after the rolls grip the rubber, as to maintain the grip. The plunger is forced down at a speed corresponding to the rate at which the thin sheet passes out of the machine. Of course, the rate of movement of the plunger will vary with the consistency of the rubber and other conditions, if the machine is to give the best results, but when the best method of controlling the air has been determined by experiment, under a given set of conditions, there are no further difficulties in operating the machine under similar conditions. The operator soon gains such familiarity with the control of the air pressure for the cracking of rubber bales of different kinds, that the operation may be carried out expeditiously and efficiently. The plunger should be held against the top of the bale with an approximately uniform pressure until the plunger is arrested at the lower limit of its movement, at which time substantially all of the rubber will have passed out of the machine. The plunger is then raised again, the doors of the box or casing opened for the introduction of another bale, and the described operations repeated.

It will be observed that the ribs of the fast roll 11 have substantially radial front faces, some of which exert a downward thrust on the rubber to carry it into the roll bite. However, the radial rib faces at and near the top of the roll, exert a certain amount of lateral pressure on the rubber in the direction of the other roll, and it is this component which tends to cause the bale to jump upwardly out of the roll bite and to break off the sheet passing between the rolls. In the modification shown in Fig. 7, this tendency is obviated to a certain extent by the provision of the grooves $10^b$ on the roll 10. These grooves $10^b$ catch and grip the bale as it is forced laterally by the ribs at the upper part of the roll 11. By providing the roll 10 with a positive engaging means of this nature, to coöperate with the ribs of the fast roll, the jumping of the bale is reduced to a degree. In order to produce the best results, however, a positively operated feed device for the bale should be used as hereinbefore described.

It will be understood that when the plunger of the feed device is forcibly brought against the upper part of the bale resting loosely on the rotating cracker rolls, the bale is squeezed out of its original shape and quickly conforms to the plunger surface. Thus the downward pressure on the plunger is uniformly distributed over a considerable surface of the bale, corresponding approximately in width to the length of the rolls. Hence, if the rolls are properly adjusted, the rubber is fed through the machine in a uniform manner at different points in the roll length, resulting in a uniform sheet of approximately the same width as the roll length.

If desired, the connection between the air cylinder and the source of compressed air may be provided with a reducing valve (not shown), for the purpose of increasing the range of pressure which may be exerted on the bale by means of the plunger. A safety valve (not shown) may also be placed on the air cylinder, if there is likelihood of the machine being tampered with by inexperienced persons.

I do not limit myself, in all aspects of the invention, to fluid operated means for applying pressure to the bale, as changes in this and many other respects may be made without departing from the broad principles of the invention as set forth in the claims.

What I claim is:

1. A rubber treating machine having rolls arranged to receive bulk rubber and discharge the same in sheet form and means for applying pressure to the stock being fed to the rolls.

2. A rubber treating machine having sheeting rolls and means for holding the rubber in the bite of the rolls including a follower and means rigidly connected to the follower by which pressure may be applied thereon, said rigid connection preventing tilting of the follower relative to said means.

3. A rubber treating machine having sheeting rolls and means for holding the rubber in the bite of the rolls including a vertically arranged piston and a follower rigidly secured thereon, and prevented from tilting relatively thereto.

4. A rubber treating machine having sheeting rolls and a pressure feeding means operatively associated therewith, said means being mounted for movement toward and from the rolls, and maintained in parallel positions during such movement.

5. A rubber treating machine having sheeting rolls and a pressure feeding means operatively associated therewith, said means being mounted for movement toward and from the rolls, but restrained from other movement.

6. A machine of the character described having rolls for reducing the stock and a pressure feed device at one side of the rolls so arranged that the treated material is discharged from the machine at the other side thereof.

7. A machine of the character described having reducing rolls, and a fluid pressure device for holding the stock in engagement with the rolls.

8. A rubber cracker having a pair of coöperating cracking rolls arranged side by side, and means above said rolls for exerting downward pressure upon the material and thereby maintaining it in the bite of said rolls said device being arranged to discharge the treated material at the other side of the rolls.

9. A rubber cracker having cracking rolls and a fluid pressure feed device coöperating therewith.

10. A rubber cracker having a frame, a pair of rolls mounted therein and arranged to receive bulk rubber at one side thereof and discharge the same in sheet form, a pressure device detachably mounted on the frame above the rolls for preventing a bale or the like from jumping out of the roll bite.

11. A rubber machine having side frames, coöperating rolls journaled therein, and a pressure device mounted on the side frame over the rolls, comprising a casing and a follower reciprocably mounted in said casing and guided against tilting movement therein.

12. A rubber machine having side frames, coöperating rolls journaled therein and a pressure feed device having a box or casing mounted on the side frames above the rolls and arranged to force bulk rubber into the roll bite and discharge it in sheet form at the opposite side of the rolls.

13. A rubber machine having side frames, coöperating rolls journaled therein and arranged to receive bulk rubber and discharge the same from the machine in sheet form, a pressure feed device above the rolls including a box or casing and means for securing the box or casing detachably on the side frames.

14. A rubber cracker having a pair of rolls arranged to receive bulk rubber and discharge the same in sheet form, a box or casing, a follower therein, and means for attaching said box or casing to the side frames of the machine, above the rolls.

15. A feeding attachment for rubber rolls arranged to receive bulk rubber and discharge the same in sheet form, having a box, a follower therein, means for actuating the follower, and means for supporting the box relatively to the rolls.

16. The combination with a pair of rolls, of a bale-receiving casing above the rolls having a door at one side, and a follower operating in said casing.

17. A rubber machine, comprising a casing, a follower movable therein, a pressure cylinder mounted on the casing, a piston in said cylinder connected with the follower, and a pair of rolls beneath the casing.

18. The combination with a pair of cracker rolls, of a casing located over the same, a plunger movable vertically in said casing, a pressure cylinder above the casing, and a piston in said pressure cylinder operatively connected with said plunger.

19. A rubber machine having side frames, rolls journaled therein and arranged to receive bulk rubber and discharge the same in sheet form, a casing located over said rolls and supported by said side frames, a plunger in said casing, and an operating device for the plunger supported on top of the casing.

20. A rubber machine having rolls and side frames, a casing having brackets whereby it is supported above the rolls on top of the side frames, a plunger in said casing, a fluid pressure cylinder supported on top of the casing, a piston in said cylinder, and means for connecting said piston with said plunger.

21. A rubber machine having rolls and side frames, a casing having side plates supported on the side frames, and provided with a door at one end, a vertically movable plunger in said casing, and means for actuating the plunger.

22. A rubber machine having rolls and side frames, a casing having side plates supported on the side frames, and provided with a door at one end, a vertically movable plunger in said casing, means for actuating the plunger, and means for guiding the plunger on the side walls of the casing.

23. An attachment for rubber crackers and the like, comprising a casing, a follower therein, means supported on top of the casing for actuating the follower, said casing being approximately square in horizontal section, and means for guiding the follower on the side walls of the casing.

24. A rubber cracker having a pair of co-operating rolls, means for driving one roll at a greater speed than the other, the fast roll being grooved in an approximately longitudinal direction to present biting ribs, and the slow roll being grooved in an approximately longitudinal direction to present relatively fine corrugations.

25. A rubber cracker having a pair of coacting cracking rolls, one of said rolls having relatively large and sharp ribs, and the other roll having a multiplicity of relatively narrow grooves.

26. A rubber cracker having a pair of coacting cracking rolls, one of said rolls having relatively large and sharp ribs, and the other roll having a multiplicity of relatively narrow grooves, said grooves being of substantially semi-circular cross-section.

27. A rubber cracker having a pair of co-operating rolls, means for driving one roll at a greater speed than the other, the fast roll being provided with sharp biting ribs, and the slow roll being provided with a multiplicity of fine, generally longitudinal grooves of substantially semi-circular cross-section.

28. A rubber machine having a pair of co-acting rolls, means for driving one roll at a greater speed than that of the other, and a pressure device for feeding the rubber through said rolls.

29. A rubber machine having a pair of coacting rolls, means for driving one roll at a greater speed than that of the other, a casing above said rolls, and a member in said casing for forcing the rubber into the bite of said rolls.

30. A rubber machine having a pair of driven rolls arranged to receive bulk rubber and discharge the same in sheet form, a casing above the same having an opening for the introduction of the material to be treated, and a member operating in said casing to force the material positively from the casing through said rolls.

In witness whereof, I have hereunto set my hand this 8 day of July, 1919.

DAVID R. BOWEN.